C. GIOVANNONI.
HOSE COUPLING.
APPLICATION FILED SEPT. 22, 1911.
1,074,319. Patented Sept. 30, 1913.
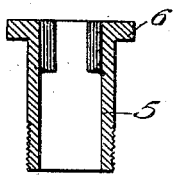
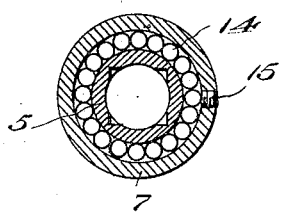
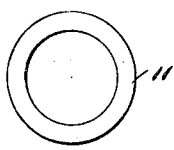
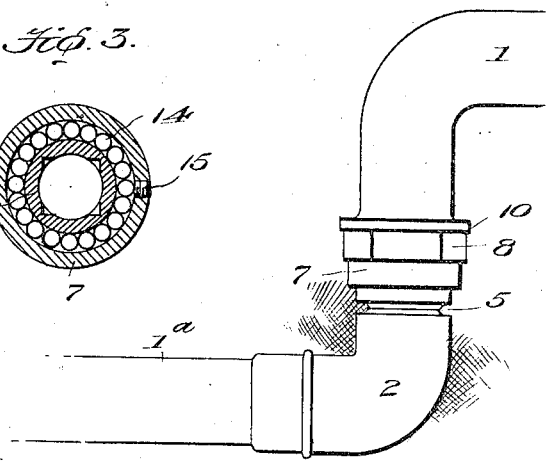
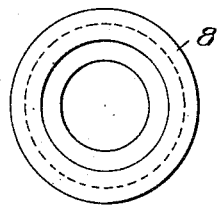
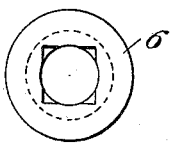
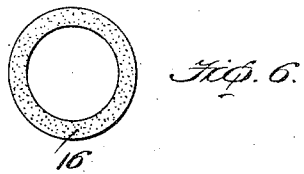
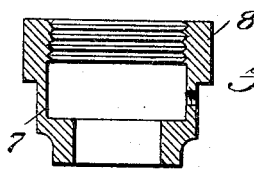
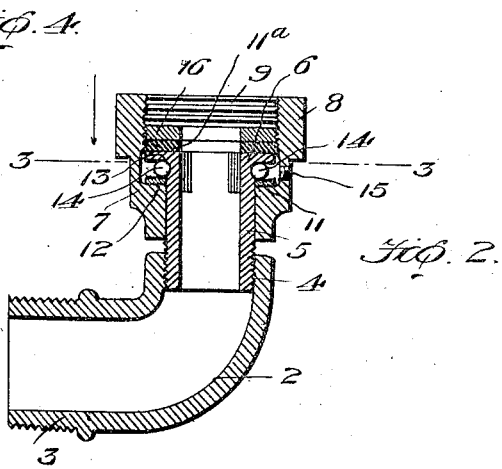
Witnesses
Charles Giovannoni Inventor
by Henry N. Copp
his Attorney

UNITED STATES PATENT OFFICE.

CHARLES GIOVANNONI, OF ENTERPRISE, OREGON, ASSIGNOR OF ONE-HALF TO C. E. CROW, OF ENTERPRISE, OREGON.

HOSE-COUPLING.

1,074,319.  Specification of Letters Patent.  Patented Sept. 30, 1913.

Application filed September 22, 1911. Serial No. 650,860.

*To all whom it may concern:*

Be it known that I, CHARLES GIOVANNONI, a citizen of the United States, residing at Enterprise, county of Wallowa, and State of Oregon, have invented certain new and useful Improvements in Hose-Couplings, of which the following is a specification.

This invention relates to hose couplings.

Garden hose is moved about and twisted during use which results in weakness and breaking where coupled to the outlet or pipe.

My object is to provide a novel swivel coupling adapted for convenient connection of a hose to the water supply pipe or outlet which will permit the hose to be moved about as desired and prevent any kinking or breaking thereof and thus relieve the hose of strain where connected to the water supply.

With the foregoing object in view, the invention consists of certain new features and combinations of parts, an example of which is set forth fully hereinafter.

In the accompanying drawings:—Figure 1 shows the invention attached to a water supply faucet; Fig. 2, a longitudinal section through the device; Fig. 3, a cross section on line 3—3, Fig. 2; Fig. 4, a detail section of the sleeve; Fig. 5, an end view thereof; Fig. 6, a face of the cushioning washer; Fig. 7, a similar view of the metal washer; Fig. 8, a section taken lengthwise of the plug; and Fig. 9, an end view thereof.

The water outlet or supply pipe is shown at 1 and forms no part of my invention.

I provide an elbow 2 having a screw-threaded end 3 adapted to engage the hose 1ª and a screw-threaded part 4 in its other end which receives an externally screw-threaded hollow plug 5 having an annular flanged head 6.

7 designates a loose sleeve which has a nut 8 so that it may be readily turned when connecting it to outlet 1 and which is provided with internal screw-threads 9 for the attachment of the screw-threaded end 10 of the outlet 1. A metal washer 11 bears against a shoulder 12 on the sleeve 7, and the plug 5 is provided with a ball cone or race 13. Between the race or cone 13 and the washer 11 are balls 14 which are retained in the race by a screw 15. A screw-threaded ring 11ª engaging threads 9 holds the plug 5 and sleeve 7 in proper relative position but with the sleeve free to turn on said plug, a gasket or washer 16 may be used. The ring 11ª, on being suitably adjusted, limits the inward play of the sleeve on the plug 5. The screw-threaded mouth of the sleeve is unobstructed and free for attachment to the outlet 1.

When the hose is moved from place to place, the elbow swings, thus preventing any breaking or kinking with consequent damage to the hose where it is connected to the source of water supply 1.

Having thus described my invention, what I claim as new and desire to secure by Letters Patent, is:—

In a pipe coupling, the combination with a pipe elbow, of a hollow plug screwed into the elbow at one end, said plug terminating in an annular flanged head at its other end, a sleeve having one end loosely and adjustably receiving the plug between the pipe elbow and the flanged head on said plug and prevented from detachment by the head of said plug, said sleeve being separated from the end of the elbow to compensate for wear and having a part extending beyond the head of the plug and there provided with internal screw-threads of greater diameter than that of the head on the plug, to permit assembling, and an externally screw-threaded flat ring of hard material engaged with the internal screw-threads of the sleeve and located inwardly from the mouth thereof, leaving the screw-threaded mouth of the sleeve unobstructed for the attachment of a pipe section, said ring being adjustable in said sleeve and adapted to limit the inward play of the sleeve.

In testimony whereof, I hereunto affix my signature in presence of two witnesses.

CHARLES GIOVANNONI.

Witnesses:
C. S. BRADLEY,
A. B. CONAWAY.